United States Patent [19]

Teranishi et al.

[11] 3,957,495

[45] May 18, 1976

[54] SOLID WRITING MATERIAL

[75] Inventors: Takeshi Teranishi; Tatuo Ishiki; Kunio Kosaki, all of Nagoya, Japan

[73] Assignee: Pilot Man-Nen-Hitsu Kabushiki Kaisha, Japan

[22] Filed: May 24, 1974

[21] Appl. No.: 473,298

[30] Foreign Application Priority Data

May 26, 1973 Japan.............................. 48-58802

[52] U.S. Cl.................................. 106/19; 35/9 G; 106/21; 106/25; 106/28; 106/32; 106/27; 427/150

[51] Int. Cl.².................. C09D 11/06; C09D 11/12; C09D 13/00

[58] Field of Search .................. 106/21, 22, 27, 28, 106/29, 31, 32, 245, 268, 271, 272; 35/9 G; 427/150

[56] References Cited
UNITED STATES PATENTS

| | | | |
|---|---|---|---|
| 2,748,024 | 5/1956 | Klimkowski et al. | 106/21 X |
| 2,755,420 | 7/1953 | Locke | 106/28 X |
| 3,079,253 | 2/1963 | Greig | 106/31 X |
| 3,484,264 | 12/1969 | Strauss et al. | 106/31 X |
| 3,672,842 | 6/1972 | Florin | 106/21 X |
| 3,769,045 | 11/1973 | Maierson et al. | 106/21 X |

OTHER PUBLICATIONS

"Castor Wax and Other Hydroxy Waxes" Technical Bulletin No. 88, pp. 8, 9 and 28, The Baker Castor Oil Company, Bayonne, New Jersey, 1966.

*Primary Examiner*—Joan E. Welcome
*Attorney, Agent, or Firm*—Wenderoth, Lind & Ponack

[57] ABSTRACT

A writing material in solid form containing a solid vehicle in which is dispersed a non-volatile oily solvent containing electron a substantially colorless donative chromogenic compound which develops color upon contact with an electron accepting substance, more than 50 % by weight of the solid vehicle being an ester of a higher (hydroxy) fatty acid or a mixture comprising an ester of a higher (hydroxy) fatty acid and a microcrystalline wax, and the non-volatile oily solvent being contained in the writing material in a range of from 10 to 50 % by weight of the entire writing material.

7 Claims, No Drawings

SOLID WRITING MATERIAL

BACKGROUND OF THE INVENTION

This invention relates generally to writing materials, and more particularly to a novel writing material which develops color when used on a surface having electron acceptors.

Heretofore, various solid vehicles such as waxes, polymers, and the like have been used for supporting pigment and forming writing materials such as crayons and "crepas". However, if such a solid vehicle supports, in a dispersed state, a non-volatile oily solvent containing an electron donative chromogenic compound of a nature developing color upon contact with an electron accepting material, it will acquire various disadvantageous features, such as the liquid substance being diffused onto the outer surface of the writing materials, thereby causing the writing material to become wet or to perspire, or the surface of the writing material to be tinted, or bringing about a deterioration of the color developing nature of the writing material at the time of writing.

When the non-voltile oily solvent is thus substantially lost or the amount thereof is much reduced, the electron transferring reaction caused at the time when the writing material comprising the electron donative chromogenic compound, non-volatile oily solvent, and the solid vehicle for supporting the compound and the solvent, is brought into contact with a surface having electron acceptors, is substantially lowered regardless of the existence of sufficient electron donative compound and electron acceptors at the contacting portion of the surface, and a considerably long time is required for developing color, or a desired density of color cannot be obtained at all.

For developing color of a high density in a short period, it is required that a solvent supporting the chromogenic compound exist in the writing material in a range of from 10 to 50 % by weight of the writing material. The non-volatile oily solvent is used for this purpose. However, it is also essential that the electron donative chromogenic compound be dissolved or dispersed in the solvent without developing color on the surface of the writing material, and that the oily solvent be substantially non-volatile at the room temperature.

As for the solvent satisfying these requirements, the solvents of high boiling points such as esters of organic acids, aromatic hydrocarbons, chlorinated polyphenyls, phosphoric acid esters, and the like can be used. However, most preferable of the solvents are non-poisonous esters of organic acids such as methyl acetyl ricinolate, dibutyl phthalate, phthalyl butyl glycolate, and aromatic hydrocarbon solvents, which have a molecular weight of from 150 to 300, and include at least one aromatic ring in the molecule, and the boiling point of which is higher than 500°F. Furthermore, any of the solvents which has somewhat higher vapor pressure than the non-volatile oily solvents and dissolves the electron donative chromogenic substance sufficiently, and which comprises, for instance, an ester of salicylic acid, of benzoic acid, and benzyl alcohol, may be used as an auxiliary solvent to assist the non-volatile oily solvent.

In the case where from 10 to 50 % by weight of non-volatile oily solvent and ordinary solid vehicles or fillers such as waxes, polymers, clay, and precipitated inorganic salts are used in the writing material, there is a possibility of the liquid compound being diffused out of the writing material and the surface of the latter becoming wet or perspiring, thereby becoming sticky.

SUMMARY OF THE INVENTION

A primary object of the present invention is to provide a writing material containing a solid vehicle whereby the above described difficulties can be substantially overcome.

Another object of the present invention is to provide a writing material containing a solid vehicle which can support the non-volatile oily solvent satisfactorily.

Still another object of the invention is to provide a writing material containing a solid vehicle which is mutually soluble with the non-volatile oily solvent, or in which the latter can be diffused when the solvent is kept at a temperature ranging from 122° to 212°F, but which is in the solid state at the room temperature and is inactive (not developing color) with the electron donative chromogenic substance.

A further object of the invention is to provide a writing material containing a solid vehicle which is easily abraded under application of an ordinary writing pressure, and hence can be easily transferred onto a writing surface.

Based on these objects and other objects hereinafter made apparent, this invention provides, in a writing material of a solid form of the type comprising a solid vehicle dispersed by a non-volatile oily solvent containing an electron donative chromogenic compound of substantially colorless character but developing color upon contact with an electron-accepting material, an improvement wherein more than 50 % by weight of the solid vehicle is an ester of a higher (hydroxy) fatty acid or a mixture of an ester of a higher (hydroxy) fatty acid and a microcrystalline wax, and the content of the non-volatile oily solvent is from 10 to 50 % by weight of the entire writing material.

The invention will be fully understood from the following detailed description of the invention.

DETAILED DESCRIPTION

A higher (hydroxy) fatty acid ester which may be used as a part of the solid vehicle in the writing material of this invention can be selected, for instance, from a group consisting of methyl (4-hydroxy) myristate, methyl (16-hydroxy) palmitate, methyl (12-hydroxy) stearate, butyl (12-hydroxy) stearate, glycerol mono (12-hydroxy) stearate, glycerol di (12-hydroxy) stearate, glycerol tri(12-hydroxy) stearate, propyl (20-hydroxy) arachate, methyl (2,3-dihydroxy) laurate, methyl (3,11-dihydroxy) myristate, butyl (15,16-didhydroxy) palmitate, methyl (9,10-dihydroxy) stearate, glycerol tri (9,10-dihydroxy) stearate, ethyl (8,9,16-trihydroxy) palmitate, and the like.

Since commercial microcrystalline waxes, such as residual wax (number of carbon atoms 36–70 and melting point from 145° to 175°F) and tank bottom wax (number of carbon atoms 40–70 and melting point from 180° to 200°F) are of extremely minute crystalline structure, those waxes can effectively support the non-volatile oily solvent.

Typical examples of commercially available microcrystalline waxes are Micro Wax 2305 (made by Mobile Oil Co. USA and having a m.p. of 170°F, HIMIC 1070 (made by Nippon Seiro Co. and having a m.p. of 173°F), Microcrystalline Wax ML 445 (made by Witco Chemical Co. and having a m.p. of 175°F), CERATAC (made by Barecono Co. USA and having a m.p. of 167°F), HIMIC 2065 (made by Nippon Seiro Co. and having a m.p. of 165°F), MULTI WAX 180M (made by Witco Chemical Co. and having a m.p. of 180°F), BARECONO 180A (made by Barecono Co. USA and having a m.p. of 180°F), CERESE WAX (made by Mobile Oil Co. USA and having a m.p. of 183°F), HIMIC 1080 (made by Nippon Seiro Co. and having a m.p. of 183°F), Micro Wax 180 (made by Nippon Petroleum Co. and having a m.p. of 180°F), ESMAX 180 (made by ESSO Standard Petroleum Co. USA and having a m.p. of 165°F), Microcrystalline Wax 200 M (made by Witco Chemical Co. USA and having a m.p. of 200°F), HIMIC 2095 (made by Nippon Seiro Co. and having a m.p. of 200°F), ES-463 (made by Barecono Co. USA and having m.p. of 165°F), ES-561 (made by Barecono Co. USA and having a m.p. of 165°F), and the like.

When one of these substances in use for more than 50% by weight of the solid vehicle, the above-mentioned liquid can be satisfactorily held in the vehicle and the above described possibility of the liquid being diffused to the outside surface of the writing material after a long period can be substantially eliminated. Among these waxes, glycerol tri (12-hydroxy) stearate which is most easily available on the market, or a mixture of this and the above-mentioned microcrystalline waxes is preferable.

Furthermore, when to these waxes are added suitable amounts of materials selected from higher hydrocarbons (m.p. higher than 120°F) such as aliphatic hydrocarbons (number of carbon atoms ranging from 24 to 32) and aromatic hydrocarbons (generally indicated by

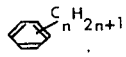

wherein $n$ is a number from 11 to 19); natural waxes such as flax wax, candelilla wax, ozocerite, carnauba wax, sugar cane wax, ceresin, montan wax, cotton wax, and Japan wax; higher normal saturated alcohols containing 14–22 carbon atoms such as tetradecanol, hexadecanol, stearyl alcohol, eicosanol, and docosanol; and cellulose derivatives such as ethyl cellulose, hydroxypropyl cellulose, acetyl cellulose butylate, and nitrocellulose, which are mutually soluble at a high temperature but are gelated in the room temperature, the strength, abrasive property, and touching characteristic of the writing material can be regulated as desired.

Among these, particularly the higher alcohols can improve the abrasive property and touching characteristic of the writing material when used with an ester of a higher (hydroxy) fatty acid and a microcrystalline wax. Moreover, a substantially colorless writing material can be obtained, in this manner, from materials easily available on the market.

The electron donative chromogenic compound to be used in the present invention is of a kind changing from the colorless state to a colored state when it is brought into contact with a suitable electron accepting substance in a suitable medium. Typical examples of the electron donative chromogenic compound are diaryl phthalides, poly aryl carbinols, leuco auramines, amyl auramines aryl auramines, rhodamine B lactams, indorines, spiropyranes, fluoranes, and the like. More specifically, the compound may be any of crystal violet lactone, malachite green lactone, Michler's hydrol, crystal violet carbinol, malachite green carbinol, N-(2,3-dichlorophenyl) leuco auramine, N-benzoyl auramine, N-acetyl auramine, N-phenyl auramine, rhodamine B lactam, 2-(phenyl imino ethane dilidene) 3,3-dimethyl indorine, N-3-3, -trimethyl indorinobenzo spiropyrane, 8-methoxy-N,3,3-trimethyl indorinobenzo spiropyrane, 3-diethylamino-b-methyl-7-chrolo fluoran, 3-diethylamino-7-methoxy fluoran, 3-diethylamino-6-benzyloxy fluoran, 12-benz-6-diethylamino fluoran, and the like.

These electron donative chromogenic compounds are substantially colorless powdery substances, and when these are brought into contact with a suitable electron accepting substance in a suitable medium, the colorless compounds are changed into a densely colored state. A typical example of the electron accepting substance is Japanese acid clay, active white clay, phenol resin, or the like.

The combinations of the electron donative substances, non-volatile oily solvents, solid vehicles, and the auxiliary solvent (if used), which may be used in various examples of the present invention are listed as follows.

| Electron donative chromogenic agent | Nonvolatile oily solvent | Solid vehicle | Auxiliary solvent |
|---|---|---|---|
| Crystal violet lactone (CVL) | dibutyl phthalate (DBP) | Microwax 200M | methyl salicylate |
| Malachite Green lactone (MGL) | dioctyl phthalate (DOP) | Multiwax 180M | ethyl salicylate |
| Rhodamine B lactam (RBL) | iso-propyl diphenyl | Diamond wax A | butyl benzoate |
| Yellow Y-1 | dibenzyl toluene | stearyl alcohol | benzyl alcohol |
| Orange 16P | Cyclohexyl diphenyl | stearic acid | — |
| PSD - G | — | beeswax | — |
| — | — | paraffin wax 140°F | — |
| — | — | ethyl cellulose | — | wherein,

Yellow Y-1: 3,6-dimethoxy fluoran made by Yamamoto Kagaku Gosei Co., and constituting an electron donative chromogenic substance for developing yellow.

Orange 16P: 3-cyclohexylamino-7-methyl fluoran made by Yamamoto Kagaku Gosei Co., and an electron donative chromogenic substance for developing orange.

PSD-G: 3-diethylamino-7-dibenzlamino-5-methyl fluoran made by Nisso Kako Co., an electron donative chromogenic substance for developing green.

Iso-propyl diphenyl: A yellowish oily liquid with a specific gravity of 0.928 at 59°F, and a vapor pressure of 11.4 mm Hg at 300°F and 760 mm Hg at 576°F.

Dibenzyl toluene: A yellowish oily liquid with a specific gravity of 1,031 at 68°F, and a vapor pressure of 3.0 mm Hg at 392°F and 760 mm Hg at 734°F.

Cyclohexyl diphenyl: A yellowish oily liquid with a specific gravity in a range of from 1,001 to 1,007 at 77°F, and a vapor pressure of 2 mm Hg at 302°F and 760 mm Hg at 684°F.

Microwax 200M: A tank bottom wax type microcrystalline wax of m.p. 200°F made by Witco Chemical Co. USA.

Multiwax 180M: A residual wax type microcrystalline wax of m.p. 180°F made by Witco Chemical Co. USA Diamond wax A: glycerol tri (12-hydroxy) stearate made by Sinnippon Rika Co.

The production of the solid writing material according to the present invention is carried out as follows:

An electron donative chromogenic substance is first dissolved in a nonvolatile oily solvent (with an above-mentioned auxiliary solvent added thereto). A solid vehicle is heated into a molten state at about 194°F. The non-volatile oily solvent prepared as described above is then added to the molten solid vehicle, and the mixture is agitated thoroughly. The mixture thus produced and still at a considerably high temperature is then cast into a mold, cooled, and solidified thereby being formed into a writing material of a bar shape.

Various examples of the writing material according to the present invention and comparative examples thereof were carried out with various detailed compositions of the substances as indicated in the following table. All parts are on a weight basis.

| Example | Composition of Writing Material | Written material | Color developing nature on the surface having electron accepting material | Stickiness (or wetting) of writing material | Coloring of writing |
|---|---|---|---|---|---|
| Ex. 1 | CVL (1.2), dibenzyl toluene (18.8), microwax 200M (20.0), diamondwax A (20.0) | Reference example 1 | Dense blue | none | none |
| Ex. 2 | MGL (1.3), iso-propyl diphenyl (13.7), diamond wax A (30.0), methyl salicylate (5.0) | Reference example 1 | Dense green | none | none |
| Ex. 3 | RBL (1.0), DBP (24.0), diamond wax A (20.0), multiwax 180M (20.0) | Reference example 1 | Dense pink | none | none |
| Ex. 4 | Yellow Y-1 (0.8), dibenzyl toluene (17.2), butyl benzoate (7.0), diamond wax A(35.0), bees wax(5.0) | Reference example 1 | Dense yellow | none | none |
| Ex. 5 | Orange 16P (0.8), DOP (15.0), multiwax 180M (10.0), stearyl alcohol (10.0), ethyl cellulose (2.0), diamond wax A (10.0). | Reference example 1 | Dense orange | none | none |
| Ex. 6 | PSD-G(1.0), dibenzyl toluene (10.0), microwax 200M (10.0), diamond wax A (10.0), stearyl alcohol (10.0), ethyl salicylate (4.0) | Reference example 2 | Dense green | none | none |
| Ex. 7 | RBL (0.4), Orange 16P (0.6), DBP (19.0), micro wax 200M (10.0), diamond wax X (20.0), stearyl alcohol (10.0) | Reference example 2 | Dense red | none | none |
| Ex. 8 | PGD-G (0.45), RBL (0.15), Orange 16P (0.45), CVL (0.75), cyclohexyl diphenyl (28.2), benzyl alcohol(5.0), beeswax (10.0), diamond wax X (35.0). | example 2 | Dense black | none | none |
| Ex. 9 | CVL (0.4), RBL (0.4), iso-propyl diphenyl (29.2), microwax 200M (20.0), stearyl alcohol (20.0), diamond wax A (10.0) | Reference example 2 | Dense purple | none | none |
| Comparative Ex. 1 | CVL (1.0), DBP (19.0), stearyl alcohol (40.0) | Reference example 1 | Dense Blue | exist | none |
| Comparative Ex. 2 | CVL (1.0), DBP (19.0), stearic acid (40.0) | Reference example 1 | Dense blue | exist | exist |
| Comparative Ex. 3 | CVL (1.0), DBP (19.0), bees wax (40.0) | Reference example 1 | Dense blue | exist | exist |
| Comparative Ex. 4 | CVL (1.0), DBP (2.0), stearyl alcohol (20.0), stearic acid (20.0) | Reference example 1 | pale blue | none | none |
| Comparative Ex. 5 | CVL(1.0), stearyl alcohol (20.0), paraffine wax 140°F (20.0) | Reference example 1 | no development off color | none | none |

The surface, on which is applied an electron accepting substance and which is capable of developing color when the substance is brought into contact with the electron donative substance contained in the writing material, can be prepared as described in the following reference examples.

REFERENCE EXAMPLE 1

Acid clay (of true specific gravity 2.15, bulk specific gravity 0.33, pH of 5 % slurry ranging from 4.5 to 5.0, and having a composition of 94.5 % $SiO_2$, 1.6 % of $Al_2O_3$, and 3.9 % of loss on ignition) — 50 parts.

Water — 75 parts.

Carboxylated styrene-butadiene copolymer latex (of a solid content being 48 %, specific gravity thereof being 1.02 and pH thereof being 8.5) – 28 parts.

The acid clay is dispersed in water by a high-speed disperser, added with the latex, and agitated sufficiently. The liquid thus prepared is then applied on the surface of paper such that the weight of the thus coated substance after out is in a range of from 4 to 8 g/m² on the surface of the paper.

REFERENCE EXAMPLE 2

Acid clay (similar to that used in the Reference Example 1) — 50 parts

Polyvinyl butyral (the degree of polymerization being about 780, the degree of butylation being greater than 67 mol %, and the acetyl residue being in a range of from 4 to 6 mol %) — 6 parts Toluene — 80 parts The acid clay was dispersed in the toluene by means of a high speed disperser, and the toluene with the acid clay thus dispersed therein was further provided with the polyvinyl butyral and agitated thoroughly, whereupon a liquid to be coated on the surface of paper was obtained. The liquid was applied on the surface of a polyvinyl chloride film in a manner such that the weight of the thus coated substance after being dried was in a range of from 4 to 8 g/m².

The color developing features of the writing materials as used for writing on these surfaces coated with an electron accepting substance, which are indicated in the table, are those observed after 30 seconds from the time of writing.

The wetting (or perspiration) of the writing material was tested by wiping the surface of the writing material, which had been kept at 104°F for 7 days, with a filter paper No.2 (made by Toyo Filter Paper Mfg. Co.), and by checking the existence of the liquid substance contained in the paper.

From the test results shown in the table, it is apparent that the writing material according to the present invention has no such wetting characteristics (or perspiration) causing the writing material to be sticky and tinted.

We claim:

1. In a writing instrument containing a writing material in solid form made by dispersing, in a solid vehicle, a non-volatile oily solvent containing a substantially colorless electron donative chromogenic compound which develops color upon contact with an electron accepting substance on a writing surface, the improvement wherein more than 50% by weight of the solid vehicle is a mixture of an ester of a higher (hydroxy) fatty acid and a microscrystalline wax, and the non-volatile oily solvent is contained in the writing material in a quantity of from 10% to 50% by weight of the writing material.

2. A writing instrument as set forth in claim 1 wherein the ester of the higher (hydroxy) fatty acid is glycerol tri (hydroxy) stearate.

3. A writing instrument as set forth in claim 1 wherein a higher normal saturated alcohol having from 14 to 22 carbon atoms is added to the solid vehicle.

4. A writing instrument as set forth in claim 3 wherein the alcohol is stearyl alcohol.

5. A writing instrument as set forth in claim 1 wherein the non-volatile oily solvent is selected from the group consisting of methyl acetyl ricinolate, dibutyl phthalate, dioctyl phthalate, phthalyl butyl glycolate and aromatic hydrocarbons having a molecular weight of from 150 to 300 and a boiling point higher than 500°F.

6. A writing instrument as set forth in claim 1 in the form of a crayon.

7. A writing instrument a set forth in claim 1 wherein the microcrystalline wax is a residual or tank bottom wax having a melting point ranging from 145° to 200°F and from 36 to 70 carbon atoms.

* * * * *